United States Patent
Rodda et al.

(10) Patent No.: US 11,199,678 B2
(45) Date of Patent: Dec. 14, 2021

(54) OPTICAL SYSTEMS FOR CAMERAS INCORPORATING LENS ELEMENTS FORMED SEPARATELY AND SUBSEQUENTLY BONDED TO LOW CTE SUBSTRATES

(71) Applicant: FotoNation Limited, Galway (IE)

(72) Inventors: Errol Mark Rodda, San Jose, CA (US); Jacques Duparre, Jena (DE)

(73) Assignee: FotoNation Limited

( * ) Notice: Subject to any disclaimer, the term of this patent is extended or adjusted under 35 U.S.C. 154(b) by 113 days.

(21) Appl. No.: 16/333,202

(22) PCT Filed: Sep. 14, 2017

(86) PCT No.: PCT/US2017/051637
§ 371 (c)(1),
(2) Date: Mar. 13, 2019

(87) PCT Pub. No.: WO2018/053181
PCT Pub. Date: Mar. 22, 2018

(65) Prior Publication Data
US 2019/0243086 A1    Aug. 8, 2019

Related U.S. Application Data

(60) Provisional application No. 62/394,644, filed on Sep. 14, 2016.

(51) Int. Cl.
*G02B 7/02* (2021.01)
*B29D 11/00* (2006.01)
(Continued)

(52) U.S. Cl.
CPC .............. *G02B 7/028* (2013.01); *B29D 11/00* (2013.01); *G02B 1/041* (2013.01); *G02B 3/0012* (2013.01);
(Continued)

(58) Field of Classification Search
CPC ...... G02B 7/028; G02B 1/041; G02B 3/0012; G02B 3/0056; G02B 3/0075; G02B 7/021; B29D 11/00; G03B 17/12; H04N 9/07
(Continued)

(56) References Cited

U.S. PATENT DOCUMENTS

2002/0003669 A1 * 1/2002 Kedar ................ G02B 27/0025
359/663
2007/0296846 A1 * 12/2007 Barman ............... H04N 5/2252
348/340

(Continued)

FOREIGN PATENT DOCUMENTS

WO    2014160142 A1    10/2014
WO    2018053181 A1    3/2018

OTHER PUBLICATIONS

International Preliminary Report on Patentability for International Application PCT/US2017/051637, Report issued Mar. 19, 2019, dated Mar. 28, 2019, 7 Pgs.

(Continued)

*Primary Examiner* — James R Greece
(74) *Attorney, Agent, or Firm* — KPPB LLP

(57) ABSTRACT

Systems and methods in accordance with embodiments of the invention implement optical systems incorporating lens elements formed separately and subsequently bonded to low coefficient of thermal expansion substrates. Optical systems in accordance with various embodiments of the invention can be utilized in single aperture cameras, and multiple-aperture array cameras. In one embodiment, a robust optical system includes at least one carrier characterized by a low coefficient of thermal expansion to which at least a primary lens element formed from precision molded glass is bonded.

19 Claims, 9 Drawing Sheets

(51) Int. Cl.
  *G02B 1/04*  (2006.01)
  *G03B 17/12* (2021.01)
  *H04N 9/07*  (2006.01)
  *G02B 3/00*  (2006.01)

(52) U.S. Cl.
  CPC ......... *G02B 3/0056* (2013.01); *G02B 3/0075* (2013.01); *G02B 7/021* (2013.01); *G03B 17/12* (2013.01); *H04N 9/07* (2013.01); *B29D 11/00298* (2013.01)

(58) Field of Classification Search
  USPC ....................................................... 359/722
  See application file for complete search history.

(56) References Cited

U.S. PATENT DOCUMENTS

| | | | | |
|---|---|---|---|---|
| 2015/0207990 A1* | 7/2015 | Ford | ...................... | G02B 6/255 348/262 |
| 2015/0373261 A1* | 12/2015 | Rodda | ............... | H01L 27/14627 348/218.1 |
| 2016/0182786 A1* | 6/2016 | Anderson | .......... | G02B 27/0075 348/360 |

OTHER PUBLICATIONS

International Search Report and Written Opinion for International Application No. PCT/US2017/051637, Search completed Oct. 30, 2017, dated Nov. 17, 2017, 11 Pgs.

* cited by examiner

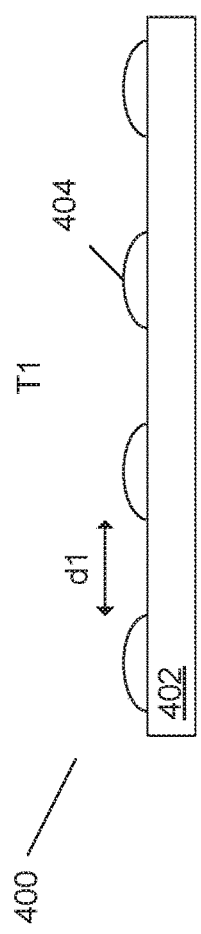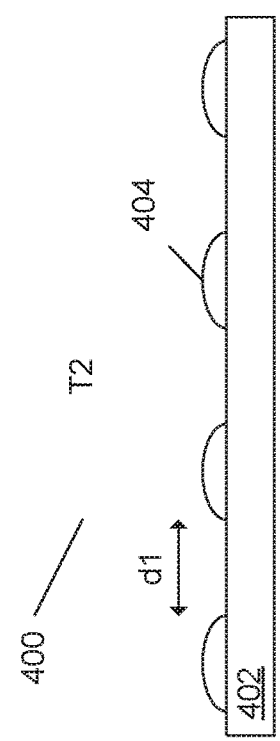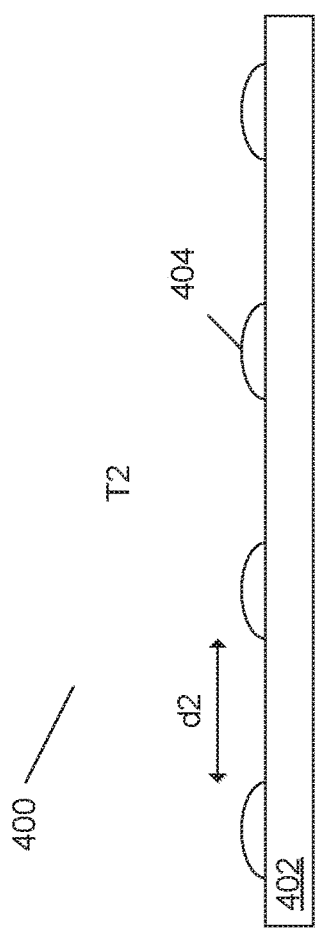

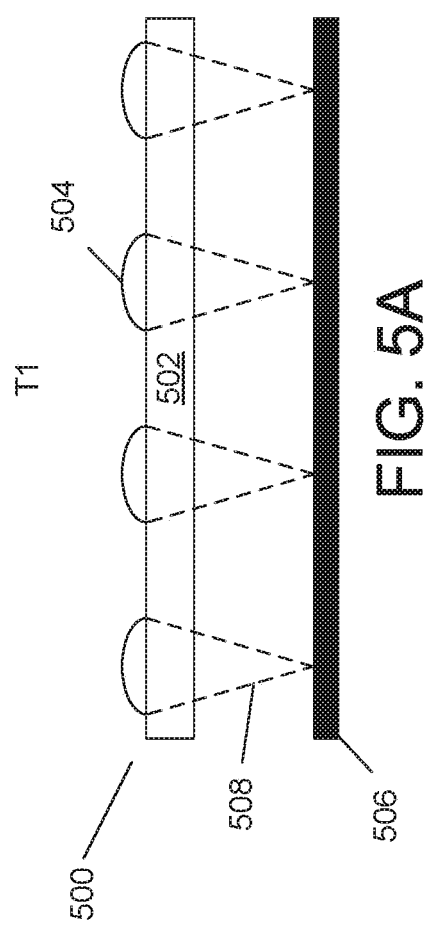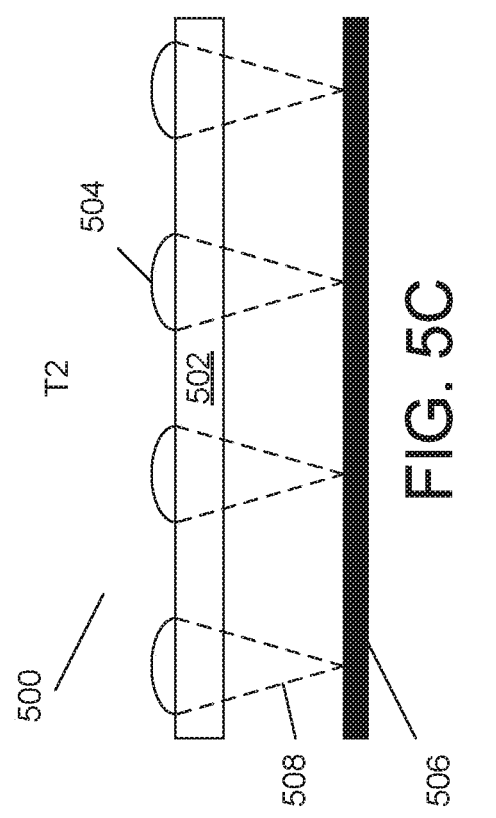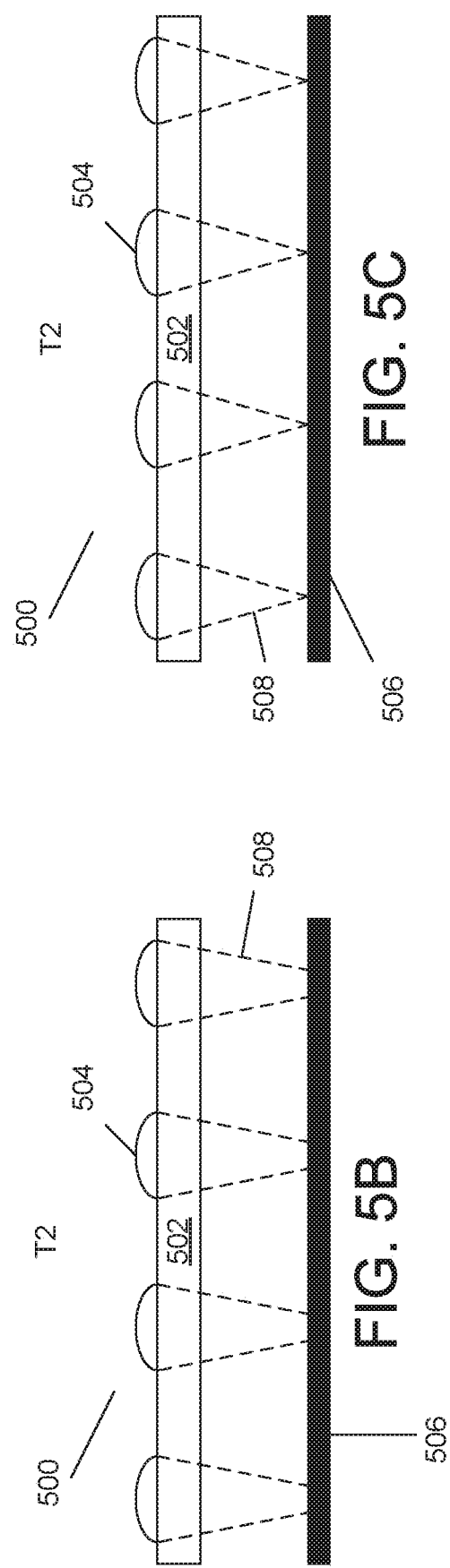

OPTICAL SYSTEMS FOR CAMERAS INCORPORATING LENS ELEMENTS FORMED SEPARATELY AND SUBSEQUENTLY BONDED TO LOW CTE SUBSTRATES

CROSS REFERENCE TO RELATED APPLICATIONS

This application is a national stage of PCT Patent Application No. PCT/US2017/051637, entitled "Optical Systems for Cameras Incorporating Lens Elements Formed Separately and Subsequently Bonded to Low CTE Substrates" to Rodda et al., filed Sep. 14, 2017, which claims priority to U.S. Provisional Application No. 62/394,644, entitled "Optical Systems for Cameras Incorporating Lens Elements Formed Separately and Subsequently Bonded to Low CTE Substrates" to Rodda et al., filed Sep. 14, 2016, the disclosures of which are incorporated by reference herein in their entirety.

FIELD OF THE INVENTION

The present invention generally relates to optical systems, and more specifically to robust optical systems suitable for implementation within cameras, including array cameras.

BACKGROUND

In response to the constraints placed upon a traditional digital camera based upon the camera obscura, a new class of cameras that can be referred to as array cameras has been proposed. Array cameras are characterized in that they include an imager array that has multiple arrays of pixels, where each pixel array is intended to define a focal plane, and each focal plane has a separate lens stack. Typically, each focal plane includes a plurality of rows of pixels that also forms a plurality of columns of pixels, and each focal plane is contained within a region of the imager array that does not contain pixels from another focal plane. An image is typically formed on each focal plane by its respective lens stack. In many instances, the array camera is constructed using an imager array that incorporates multiple focal planes and an optic array of lens stacks. In other configurations, separate image sensors and optical systems can be utilized to form an array camera. Many configurations involve the use of a single sensor with a single pixel array on which images are formed by an optic array of lens stacks or separate optical systems.

SUMMARY OF THE INVENTION

Systems and methods in accordance with embodiments of the invention implement robust optical systems that can be implemented within cameras, including array cameras. In one embodiment, a robust optical system includes a carrier characterized by a low coefficient of thermal expansion and at least one glass lens element.

One embodiment of the invention includes a camera array, including: a processor, memory, and an optical system that includes: a carrier substrate supporting several lens elements bonded to the carrier substrate including at least one glass lens element, a primary lens element proximate to a scene to be imaged and having a first coefficient of thermal expansion, a secondary lens element proximate to an image sensor and having a second coefficient of thermal expansion that is different from the first coefficient of thermal expansion, where the image sensor is aligned with the back focal lengths of the plurality of lens elements.

In a further embodiment, the first coefficient of thermal expansion is lower than the second coefficient of the thermal expansion.

In a further embodiment again, the first coefficient of thermal expansion is higher than the second coefficient of the thermal expansion.

In a still further embodiment, the carrier substrate is a glass material having a relatively low coefficient of thermal expansion such that optical characteristics of the glass remain consistent with variations in temperature.

In a yet further embodiment, the at least one glass lens element has a lower coefficient of thermal expansion relative to a coefficient of thermal expansion of a polymer material used for the secondary lens element.

In a yet another embodiment, the camera array includes an aperture-defining mask disposed on the carrier substrate.

In a further additional embodiment again, the aperture defining mask creates virtual lens barrels providing optical isolation between lens stacks.

In a further embodiment again, the mask has a thickness that is approximately on the order of magnitude of the thickness of the lens element.

In another embodiment again, at least one lens element is distanced from the carrier substrate by an air gap.

In a further additional embodiment, at least one lens element is distanced from the carrier substrate by a material having different optical characteristics.

In a further additional embodiment again, the primary lens element is plano-convex and the secondary lens element is plano-concave.

In still yet another embodiment, the primary lens element was formed using precision glass molding and the secondary lens element was formed using injection molding to form plastic elements.

In still another embodiment again, the primary lens element is a meniscus lens and the secondary lens element is a biconcave lens.

In yet a further embodiment, a gap separates the meniscus lens and the biconcave lens from the glass substrate.

A yet further embodiment, the carrier substrate is a glass substrate with integrated aperture stops.

In yet another additional embodiment, at least one lens element differs between lens stacks that image different color channels.

In another embodiment, all of the optical elements differ between lens stacks that image different color channels.

In the glass substrate is fabricated so as to include embedded color filters.

In a further embodiment again, the optical system further includes a color filter for each constituent lens stack in the carrier substrate.

In still a further embodiment, the several lens elements include lens elements fabricated from certain cavities associated with certain substrate thicknesses within overall batch variation and adhesives with differently sized spacer-beads to increase homogeneity of the fabricated optical system.

Another embodiment provides a camera array that includes: a processor, memory, and an optical system including: a glass carrier substrate supporting several lens elements bonded to the carrier substrate, a glass lens element proximate to a scene to be imaged and having a first coefficient of thermal expansion, a polymer lens element proximate to an image sensor and having a second coefficient of thermal expansion that is higher than the first coefficient of thermal expansion, where the image sensor is aligned with the back focal lengths of the plurality of lens elements.

BRIEF DESCRIPTION OF THE DRAWINGS

FIGS. 4A-4C illustrates how substrates having a low coefficient of thermal expansion can mitigate pitch variation with temperature in accordance with certain embodiments of the invention.

FIGS. 5A-5C illustrate how utilizing glass lens elements can mitigate back focal length variation with temperature in accordance with certain embodiments of the invention.

DETAILED DESCRIPTION

Figure 1:
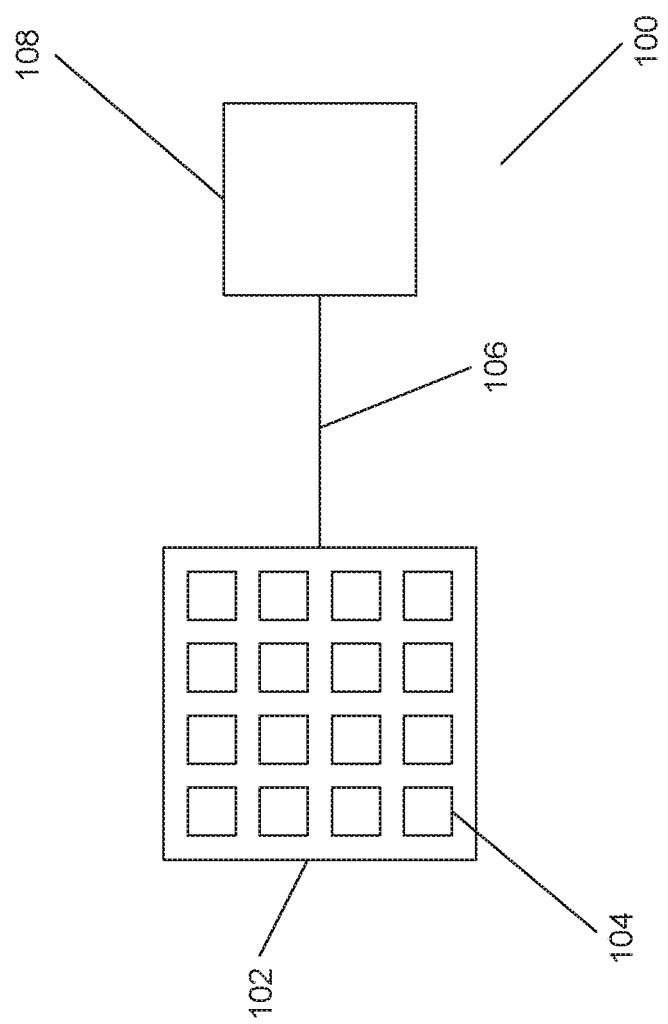
FIG. 1 conceptually illustrates an array camera architecture in accordance with an embodiment of the invention.

Turning now to the drawings, systems and methods for implementing optical systems including lens elements formed separately and subsequently bonded to low coefficient of thermal (CTE) expansion substrates that can be utilized within cameras, including array cameras, are illustrated. Processes for constructing array cameras using lens stack arrays are described in U.S. Pat. App. Pub. No. 2011/0069189, entitled "Capturing and Processing of Images Using Monolithic Camera Array with Heterogeneous Imagers", to Venkataraman et al. The monolithic array camera modules illustrated in U.S. Pat. App. Pub. No. 2011/0069189 can be constructed from an optic array of lens stacks—each lens stack in the array defining an optical channel—and an imager array including a plurality of focal planes corresponding to the optical channels in the optic array. U.S. Pat. App. Pub. No. 2011/0069189 also discloses non-monolithic array cameras including arrays constructed from an array of array cameras. The disclosure of U.S. Pat. App. Pub. No. 2011/0069189 is hereby incorporated by reference, especially as it pertains to disclosing array camera configurations and processes for constructing such array camera configurations.

The combination of a lens stack and its corresponding focal plane can be understood to be a 'camera module' (as opposed to an 'array camera module'). An imager array can be implemented on an image sensor that includes a plurality of microlenses, each of which are configured to direct light to a single photodiode or similar sensor element. When an imager array is implemented on an image sensor—the terms 'imager array' and 'image sensor' can be interchangeable. Importantly, although a photodiode is referenced, it can be appreciated that that any suitable photodetector may be implemented. For example, PCT Pat. App. No. PCT/US2014/023762 entitled "Array Camera Architecture Implementing Quantum Film Image Sensors" discloses implementing quantum dots and quantum films to enable photodetection. The disclosure of PCT Pat. App. No. PCT/US2014/023762 is incorporated by reference in its entirety, especially as it pertains to implementing quantum dots and quantum films within image sensors. Typically, array cameras are configured to capture image data that can be used to form multiple images of a single scene using their constituent camera modules, and process the image data to yield a single image of the scene with improved image properties.

Although array cameras possess much potential for providing high quality image capture, in many instances, the configurations employed by array cameras are susceptible to detrimental effects caused by temperature dependencies, for example (lateral) thermal expansion. For instance, thermal expansion effects can cause the spatial relationships between the constituent optical elements to vary with varying temperature. In other words, thermal expansion can cause the pitch between lenses to vary as a function of temperature. Additionally, in many instances the optical characteristics of lens elements that are typically used in modern cameras (e.g. those made from plastics/polymers), vary noticeably as a function of temperature. For example, the refractive indices of polymer lenses that are formed by UV curing or plastic injection molding typically vary significantly with temperature. Nonetheless, in conventional camera systems that incorporate only a single optical channel, these issues generally either do not present any significant consequence or else are easily mitigated. For instance, the autofocus systems of such cameras can be used to mitigate the variation of back focal length with temperature. However, these issues are not so easily mitigated in array cameras; instead, the variation with temperature can inhibit the efficacy, versatility, and/or practicability of an array camera.

Thus, in many embodiments of the invention, optical system configurations are implemented that are more resilient against variation in temperature and that are more amenable to higher-yield manufacturing processes. In many embodiments, optical systems are manufactured that include a carrier substrate characterized by a low coefficient of thermal expansion (a material property characterizing how much a material expands or contracts with variation in temperature), and at least one lens element formed separately from and then subsequently bonded to one or more substrates. In a number of embodiments, at least one of the lens elements is a glass lens element formed by precision glass molding. The optical characteristics of lens elements made from glass can be made to be relatively stable over a range of temperatures. In several embodiments, the lens element with the highest optical power within a respective lens stack is formed from glass while other lens elements can be formed from polymers. Polymer lens elements tend to be less expensive, but their refractive indices are generally more strongly dependent on temperature, and they also tend to have higher coefficients of thermal expansion. Therefore, a hybrid arrangement of glass lens elements forming primary lens surfaces and less expensive polymer lens elements forming secondary lens surfaces can achieve higher thermal stability than an equivalent lens stack implemented exclusively using polymer lens elements and at lower cost than an equivalent lens stack implemented exclusively with glass lens elements. In some embodiments, the optical system includes a carrier substrate characterized by a coefficient of thermal expansion that matches that of the associated image sensor. In many embodiments, the carrier substrate is a glass material. Glass generally is characterized by lower coefficient of thermal expansion relative to polymers, and can thereby mitigate adverse camera performance issues related to thermal expansion phenomena, e.g. lateral thermal expansion phenomena and the resulting (temperature-dependent) pitch differences between lens-arrays and associated sensor-arrays.

In a number of embodiments, an aperture-defining mask is disposed on the carrier substrate. In some embodiments, the aperture-defining mask is thick and can thereby create virtual lens barrels that can provide effective optical isolation between lens stacks. In several embodiments, at least one lens element is distanced from the substrate by either an air gap, or else some material having different optical characteristics (e.g. a different refractive index and/or a different abbe number).

Array cameras and array camera modules that include including lens elements formed separately from and subsequently bonded to low coefficient of thermal (CTE) expansion substrates are discussed further below.

Array Camera Architectures

Array cameras in accordance with many embodiments of the invention can include an array camera module and a processor configured by an image processing application stored in memory. The array camera module can include an array of camera modules. An array camera module can alternatively be implemented using an imager array, which is a sensor that includes an array of focal planes, and an optic array of lens stacks. Each focal plane can include an array of pixels used to capture an image formed on the focal plane by a lens stack. The focal plane can be formed of, but is not limited to, traditional CIS (CMOS Image Sensor), CCD (charge-coupled device), quantum film image sensors that include quantum dots (e.g. as disclosed in PCT Pat. App. No. PCT/US2014/023762), high dynamic range sensor elements, multispectral sensor elements and various alternatives thereof. In many embodiments, the pixels of each focal plane have similar physical properties and receive light through the same lens stack. Furthermore, the pixels in each focal plane may be associated with the same spectral filter. Each pixel can have an associated microlens to direct light to the associated photodiode (or other photodetector). In a number of embodiments, at least one of the focal planes includes a Bayer-pattern filter. Thus, for example, one focal plane can have color filters embedded within the microlenses in a Bayer-pattern, and another focal plane can have a color filter implemented elsewhere within the optical channel of the array camera module. For example, in many embodiments a single color filter corresponds to a single camera module and is implemented within the optical channel a distance from the image sensor. Thus for example, a 'green camera module' may be implemented where a green color filter is associated with a camera module. Of course, a camera module can be associated with any spectral band (i.e. not just a 'green' spectral band) in accordance with embodiments of the invention. More generally, any of a variety of focal planes and focal plane arrangements can be implemented. In other embodiments, array camera modules can be implemented using any combination of a single sensor including a single pixel array on which multiple images are formed in different regions (virtual focal planes), multiple sensors that each possess one or more focal planes, separate lens barrels that each contain a single lens stack formed using lens elements formed separately and subsequently bonded to at least one substrate, and/or an array of optical elements formed using lens elements formed separately from and subsequently bonded to at least one substrate.

In several embodiments, the focal planes are independently controlled. In other embodiments, the operation of the focal planes in the imager array is controlled via a single set of controls. Array cameras are discussed in U.S. Pat. App. Pub. No. 2012/0012748 entitled "Architectures for imager arrays and array cameras" and U.S. Pat. No. 8,514,491 entitled "Capturing and processing of images using monolithic camera array with heterogenous imagers," and the disclosure of U.S. Pat. No. 8,514,491 and U.S. Pat. App. Pub. No. 2012/0012748 are hereby incorporated by reference in their entirety, especially as they pertain to array camera architectures and the controlled operation of focal planes.

An array camera architecture that can be used in a variety of array camera configurations in accordance with embodiments of the invention is illustrated in FIG. 1. The array camera 100 includes one or more array camera modules 102 that is configured to transmit 106 image data to a receiving device 108 via an interface format involving the transmission of additional data describing the transmitted image data. In many embodiments, the receiving device is a processor configured by software, such as an image processing application, stored in memory. The processor can be any of or any combination of a general purpose processor, a graphics processing unit (GPU) or co-processor, a machine vision processing unit or co-processor, and/or a custom circuit designed for the requirements of a specific application. The array camera module 102 includes an array of camera modules 104. The camera modules 104 in the array camera module 102 are formed from the combination of a lens stack and a focal plane. The array camera module 102 can include an optic array of lens stacks and an imager array of focal planes. The array camera module 102 can also be implemented using individual lens barrels and/or using separate sensors for each focal plane. These multiple camera modules 104 may be active or inactive at any given time. The image data captured by these multiple camera modules may be transmitted from the focal planes of each camera to a processor. The focal planes may have different imaging characteristics, such as varying exposure times, start times, and end times. Therefore, the timing of the transmission of the image data captured by each focal plane can vary. Accordingly, the imager array can transmit additional data describing the image data to enable a device receiving the image data to appropriately reconstruct images from the received image data. The transmission of array camera image data is disclosed in U.S. Pat. No. 8,305,456 entitled "Systems and Methods for Transmitting and Receiving Array Camera Image Data," the disclosure of which is hereby incorporated by reference in its entirety, especially as it relates to the transmission of array camera image data.

In many embodiments, the array camera 100 captures images using a plurality of camera modules 104, which can have different imaging characteristics. The array camera 100 can separately control each of the cameras to obtain enhanced image capture and/or to enhance processes such as (but not limited to) super-resolution processes that may be applied to the captured images. For example, each pixel of a focal plane may capture different wavelengths of light, or may capture different light intensities, varying exposure times, start times, or end times. Once the array camera 100 has commenced capturing image data using the pixels on the imager array, the focal planes can commence transmitting the image data captured using the pixels to a receiving device 108. The image data captured by different cameras can be interleaved for transmission to a receiving device 108 that includes interface circuitry configured to receive image data. In many embodiments, the interface circuitry is implemented in hardware and/or using a processor. The receiving device 108 can then organize the captured image data from the received packet and appropriately combine the image data to process and/or reconstruct the image(s) captured by one or more of the focal planes in the imager array.

In the illustrated embodiment, image data from multiple images of a scene can be captured by the array camera module 102. As the image data is captured, the array camera module 102 transmits 106 the image data to a receiving device 108. The array camera module 102 transmits the image data using a small number of local data storage cells on the array camera module 102 that store the captured image data following capture by the cameras. In the illustrated embodiment, the array camera module 102 manages the capture and transmission of image data so that the captured image data stored in the storage cells is transmitted by the imager array of the array camera module 102 in the time taken to capture and load the next set of image data into the storage cells. In this way, the array camera module can continuously buffer and transmit image data using a number of local data storage cells that is less than the total number of pixels in the array camera module.

In many embodiments, a line of image data transmitted by an imager array can be considered to equal the number of pixels in a row of a focal plane multiplied by the number of focal planes. In several embodiments, the clock frequency of transmitter circuitry on the imager array is set to a desired output data rate and the internal focal plane pixel rate is set to 1/(M×N) the desired output data rate (where M×N is the total number of focal planes). In many image transmission protocols, once a start of line condition is sent, all of the image data is transmitted without interrupt until the end of line. Accordingly, a sufficient number of data storage cells and a buffering mechanism can be developed that starts transmission of pixels once there are sufficient pixels stored such that all of the pixels will have been captured and transmitted by the time the end of the line of image data is reached. If, for example, an imager array including 16 focal planes (as in a 4×4 array) transmits image data from all focal planes, then there is very little data storage utilized prior to the start of focal plane readout, because the data is transmitted at approximately the rate that at which it is being read. If, however, the same imager array only has one active imager, then almost all of the pixels from a row of the focal plane are stored since the buffer is being read 16 times as fast as it is being written. Therefore, the data storage requirement would be one row of pixels (i.e. 1/16th of a line of image data). When eight focal planes are active, half the data from all eight focal planes is buffered before transmission commences to avoid underflow. Therefore, the total number of data storage cells utilized is equal to four rows of pixels or one quarter of a line of image data. The above examples illustrate how the data storage requirements of an imager array can vary based upon the number of active focal planes. In many embodiments, the total number of storage cells within an imager array is less than a quarter of a line of image data. In several embodiments, the total number of storage cells within an imager array is equal to a line of image data. In several embodiments, the total number of data storage cells is between a quarter of a line of image data and a full line of image data. In a number of embodiments, the total number of storage cells is equal to or greater than a line of image data. When the array camera module transmits the captured image data, the incorporation of additional data describing the image data enables a peripheral device receiving the image data to reconstruct the images captured by each active camera in the imager array 102.

Imager arrays in accordance with many embodiments of the invention are configured to output image data via an interface format that accommodates the transfer of image data captured via multiple focal planes. In several embodiments, the imager array is configured to transmit captured image data in accordance with an interface format that is compatible with standard interface formats, such as (but not limited to) the MIPI CSI-2 interface format (MIPI interface format), the Camera Link interface format, and any of the Universal Serial Bus (USB) interface formats or FireWire interface formats. When image data captured from multiple focal planes is output by the imager array, the device receiving the image data is faced with the task of assembling the image data into a plurality of images of a scene.

Although specific array camera system architectures are discussed above for constructing array cameras including M×N arrays of cameras, any of a variety of system architectures for array cameras including M×N arrays of cameras can be utilized as appropriate to the requirements of a specific application in accordance with embodiments of the invention. Imager array architectures are discussed below in greater detail.

Imager Array Architectures

Figure 2:
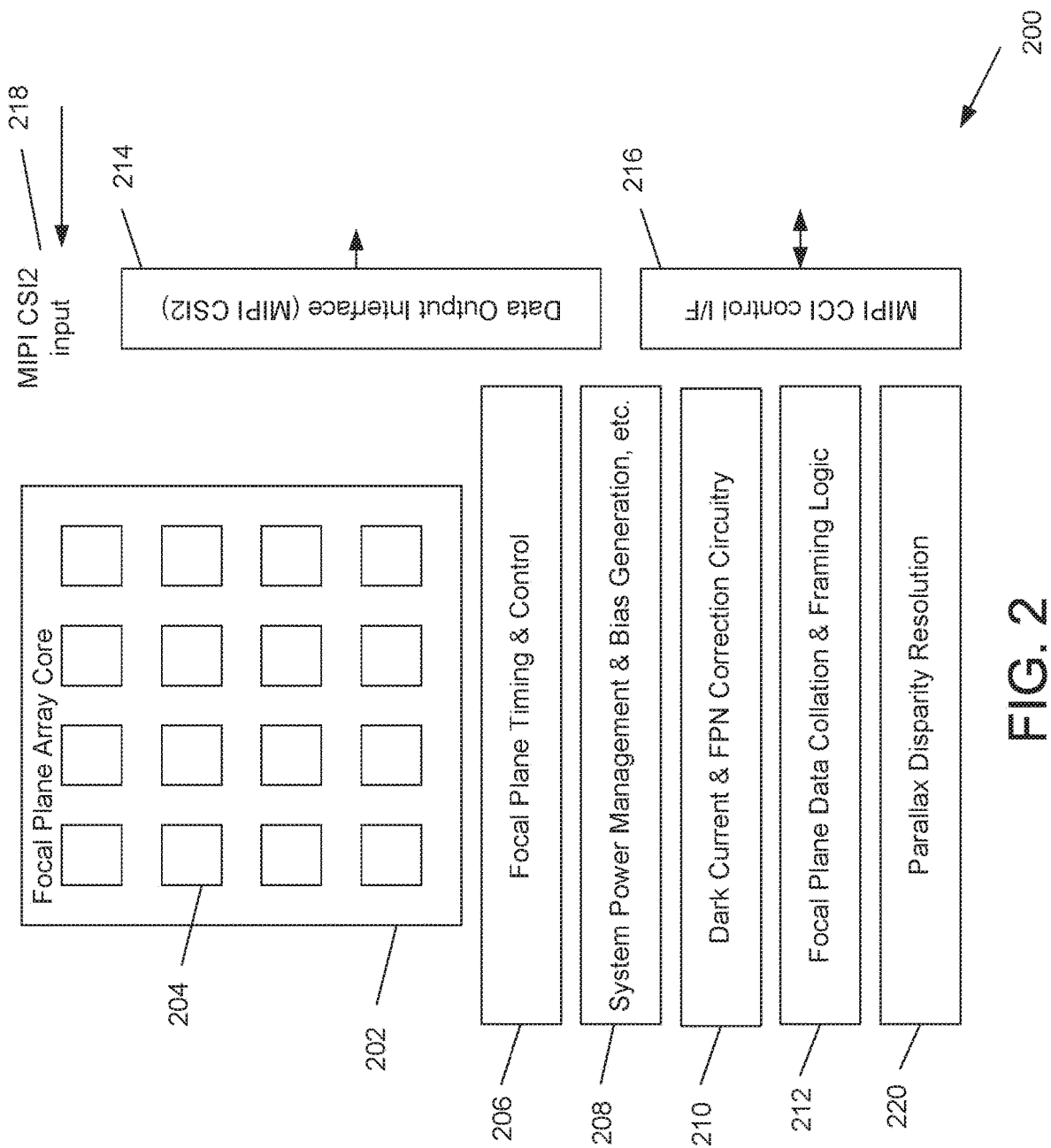
FIG. 2 conceptually illustrates an imager array architecture in accordance with an embodiment of the invention.

An imager array in accordance with an embodiment of the invention is illustrated in FIG. 2. The imager array 200 includes a focal plane array core 202 that includes a M×N array of focal planes 204 and all analog signal processing, pixel level control logic, signaling, and analog-to-digital conversion circuitry. The imager array also includes focal plane timing and control circuitry 206 that is responsible for controlling the capture of image information using the pixels. For example, in some embodiments, the focal plane timing and control circuitry 206 can synchronize the capture of image data by the focal planes such that active focal planes capture image data from a scene simultaneously. In many embodiments, the focal plane timing and control circuitry 206 causes the active focal planes to capture image data from a scene in a particular controlled sequence. In a number of embodiments, the focal plane timing and control circuitry 206 utilizes reset and read-out signals to control the integration time of the pixels. In several embodiments, any of a variety of techniques can be utilized to control integration time of pixels and/or to capture image information using pixels. In many embodiments, the focal plane timing and control circuitry 206 provides flexibility of image information capture control, which enables features including (but not limited to) high dynamic range imaging, high speed video, and electronic image stabilization. In various embodiments, the imager array 200 includes power management and bias generation circuitry 208. The power management and bias generation circuitry 208 provides current and voltage references to analog circuitry such as the reference voltages against which an ADC would measure the signal to be converted against. In many embodiments, the power management and bias circuitry also includes logic that turns off the current/voltage references to certain circuits when they are not in use for power saving reasons. In several embodiments, the imager array includes dark current and fixed pattern (FPN) correction circuitry 210 that increases the consistency of the black level of the image data captured by the imager array and can reduce the appearance of row temporal noise and column fixed pattern noise. In several embodiments, each focal plane includes reference pixels for the purpose of calibrating the dark current and FPN of the focal plane and the control circuitry can keep the reference pixels active when the rest of the pixels of the focal plane are powered down in order to increase the speed with which the imager array can be powered up by reducing the need for calibration of dark current and FPN. In many embodiments, the 'system on a chip' (SOC) imager includes focal plane framing circuitry 212 that packages the data captured from the focal planes into a container file and can prepare the captured image data for transmission. In several embodiments, the focal plane framing circuitry 212 includes information identifying the focal plane and/or group of pixels from which the captured image data originated. In a number of embodiments, the imager array 200 also includes an interface for transmission of captured image data to external devices. In the illustrated embodiment, the interface is a MIPI CSI 2 output interface supporting four lanes that can support read-out of video at 30 fps from the imager array and incorporating data output interface circuitry 214, interface control circuitry 216 and interface input circuitry 218. Typically, the bandwidth of each lane is optimized for the total number of pixels in the imager array and the desired frame rate. The use of various interfaces including the MIPI CSI 2 interface to transmit image data captured by an array of focal planes within an imager array to an external device in accordance with embodiments of the invention is described in in U.S. Pat. No. 8,305,456 cited to and incorporated by reference above.

An imager array in accordance with embodiments of the invention can include a single controller that can separately sequence and control each focal plane. Having a common controller and I/O circuitry can provide important system advantages including lowering the cost of the system due to the use of less silicon area, decreasing power consumption due to resource sharing and reduced system interconnects, simpler system integration due to the host system only communicating with a single controller rather than M×N controllers and read-out I/O paths, simpler array synchronization due to the use of a common controller, and improved system reliability due to the reduction in the number of interconnects.

Additionally, an imager array in accordance with embodiments of the invention may include a parallax disparity resolution module 220 that can determine disparity between pixels in different images captured by the camera array using parallax detection processes similar to those described in U.S. Pat. No. 8,619,082 entitled "Systems and Methods for Parallax Detection and Correction in Images Captured Using Array Cameras" to Venkataraman et al., the disclosure of which is incorporated by reference herein in its entirety, especially as it pertains to array cameras employing parallax detection, depth estimation, and image correction processes. In embodiments where one-dimensional array camera modules or array cameras or implemented (e.g. M=1), the processing requirements for a parallax disparity resolution calculation may be sufficiently low that the process may be computed by the imager array circuitry.

Although specific components of an imager array architecture are discussed above with respect to FIG. 2, any of a variety of imager arrays can be constructed in accordance with embodiments of the invention that enable the capture of images of a scene at a plurality of focal planes in accordance with embodiments of the invention. Moreover, array cameras and array camera modules can be constructed using multiple discrete cameras. Array camera modules that utilize imager arrays are discussed below.

Array Camera Modules

Array camera modules in accordance with many embodiments of the invention include the combination of an optic array including a M×N array of lens stacks and an imager array that includes a M×N array of focal planes. Each lens stack in the optic array defines a separate optical channel. The optic array may be mounted to an imager array that includes a focal plane for each of the optical channels, where each focal plane includes an array of pixels or sensor elements configured to capture an image. When the optic array and the imager array are combined with sufficient precision, the array camera module can be utilized to capture image data from multiple images of a scene that can be read out to a processor for further processing, e.g. to synthesize a high resolution image using super-resolution processing. For example, each of the cameras in an array camera module can capture image data of a scene reflecting a sub-pixel shifted view of the scene—i.e. relative to the corresponding image formed by at least one other camera (e.g. the lens stack of each camera can have a field-of-view that is shifted with respect to the field-of-view of each other camera so that each shift includes a sub-pixel shifted view of the scene); hence, the aggregated image data can embody sufficient sampling diversity to enable the implementation of super-resolution processes that can be used to construct an enhanced image of the scene using the aggregated image data. In other words, each lens stack can form an image of a scene onto a corresponding focal plane, and thereby generate image data, from a slightly different viewpoint relative to an image formed by each of the other lens stacks, such that the images formed of the scene by each of the lens stacks contain non-redundant information about the scene. Hence, the non-redundant information can be used in the construction of a super-resolved image.

In many embodiments, the optics in an array camera module are designed to be able to resolve images to a sufficient extent such that the super-resolution processes can be implemented. For example, in many instances, the MTF of the optics is able to resolve variation in intensity at the spatial resolution of the image that is to result from implemented super-resolution processes (e.g. as opposed to the spatial resolution of the image that can be formed by a single respective camera within an array camera module).

It should be noted that although 'arrays of lens stacks' and 'arrays of focal planes' are referenced, it is not meant to be suggested that such arrays are necessarily monolithic structures. In many instances a plurality of distinct lens stacks are disposed relative to one-another to form a M×N array of lens stacks; similarly, in many instances a plurality of distinct focal planes are disposed relative to one-another to form a M×N array of focal planes. In general, a plurality of lens stacks, and a plurality of focal planes can be adjoined in any suitable way to construct a M×N array camera module in accordance with embodiments of the invention. For example, U.S. Provisional Pat. App. Ser. Nos. 61/901,378 and 61/904,947 disclose non-monolithic array camera configurations. U.S. Provisional Pat. App. Ser. Nos. 61/901,378 and 61/904,947 are incorporated by reference in their entirety, especially as they pertain to non-monolithic array camera configurations including processes for constructing such configurations. In many instances, the focal planes and/or lens stacks are embodied within monolithic structures.

Additionally, it should be clear that one-dimensional array cameras and array camera modules can also be implemented in accordance with embodiments of the invention. One-dimensional array cameras and array camera modules are disclosed in U.S. Pat. App. Pub. No. 2014/0240528 entitled "Thin Form Factor Computational Array Cameras and Modular Array Cameras". The disclosure of U.S. Pat. Pub. No. 2014/0240528 is hereby incorporated by reference in its entirety, especially as it pertains to architectures and configurations for one-dimensional array cameras and array camera modules.

Figure 3:
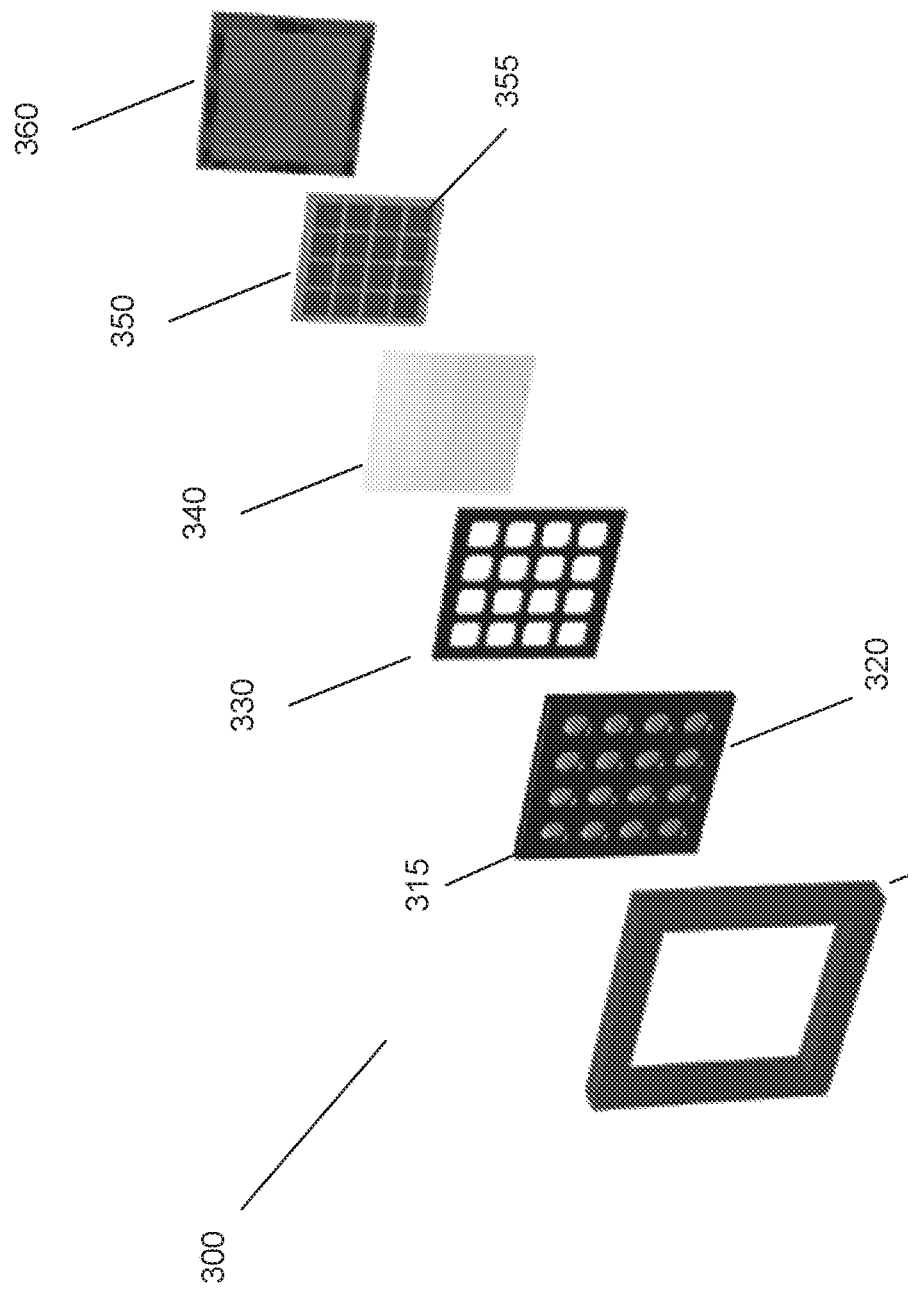
FIG. 3 conceptually illustrates the construction of an array camera module in accordance with an embodiment of the invention.

An exploded view of an array camera module formed by combining a lens stack array with a monolithic sensor including an array of focal planes in accordance with an embodiment of the invention is illustrated in FIG. 3. The array camera module 300 includes a housing 310, an optic array 320 including M×N distinct lens stacks 315 forming M×N separate apertures associated with M×N separate views of a scene, a spacer 330, a cover glass 340, and an image sensor 350 including M×N separate focal planes 355. Additionally, a PCB 360 is depicted; the array camera module 300 can be adjoined to the PCB to form the array camera. Each lens stack 315 in the optic array 320 creates an optical channel that resolves an image on one of the focal planes 355 on the imager array 350. Each of the lens stacks 315 may be of a different type. Importantly, each of the lens stacks can be associated with a different spectral filter and/or include lens elements constructed from materials having different refractive indexes and/or having different shapes. For example, in several embodiments, the optical channels are used to capture images of different portions of the wavelength of light spectrum (e.g. using color filters, located either within the lens stack or on the sensor) and the lens stack in each optical channel is specifically optimized for the portion of the spectrum imaged by the focal plane associated with the optical channel. In many embodiments, π filter groups are patterned onto the imager array; π filter groups are disclosed in U.S. Pat. App. Pub. No. 2013/0293760, the disclosure of which is hereby incorporated by reference in its entirety, especially as it pertains to color filter configurations that adopt a π filter group pattern.

In many embodiments, the array camera module 300 includes lens stacks 315 having one or multiple separate optical lens elements axially arranged with respect to each other. Optic arrays of lens stacks 320 in accordance with several embodiments of the invention include one or more adaptive optical elements that can enable the independent adjustment of the focal length of each lens stack and/or lateral shifting of the centration of the refractive power distribution of the adaptive optical element. The use of adaptive optical elements is described in U.S. Pat. App. Pub. No. 2013/0088637, entitled "Lens Stack Arrays Including Adaptive Optical Elements", the disclosure of which is incorporated by reference herein in its entirety, especially as it pertains to the incorporation of adaptive elements within lens stacks.

The optic arrays of lens stacks and the imager array can be aligned and adjoined using any of a variety of techniques. For instance, the alignment techniques disclosed in U.S. Pat. App. Pub. Nos. 2014/0002674, U.S. patent application Ser. No. 14/195,675 and PCT Publication No. WO/2014/160142 can be implemented in accordance with embodiments of the invention. The disclosure of U.S. Pat. App. Pub. No. 2014/0002674 is incorporated by reference in its entirety, especially as it pertains to assembling an array camera module by repeatedly measuring the efficacy of the module as a function of the spatial orientation between an optic array and an imager array. The disclosure of U.S. patent application Ser. No. 14/195,675 is incorporated by reference in its entirety, especially as it pertains to determining a preferred spatial orientation for a representative optic array of lens stacks and a representative imager array, and implementing that spatial arrangement onto a plurality of constituent optic arrays and imager arrays to assemble a series of array camera modules. The disclosure of PCT Application No. PCT/US14/25904 is incorporated by reference in its entirety, especially as it pertains to aligning an optical array of lens stacks with an imager array such that each of at least two constituent cameras are characterized by different central viewing directions.

Although the optics for array camera modules can be fabricated using wafer level optics (WLO) techniques to create lens elements out of resin-based materials and/or polymers directly onto glass substrates, in many instances the formed lens elements undesirably possess refractive indices that are highly dependent on temperature. Similarly, where polymeric lens elements are formed by injection molding, the relatively large (lateral) coefficient of thermal expansion of the polymeric material can further impact the optical characteristics of the formed lens elements and the accuracy of the calibration of the imaging system, since with polymer injection molding also the substrate is made from the lens material (during the lens array molding process, all is done in one piece and in one step). These phenomena can be undesirable for a number of reasons including that a variation in temperature can distort the pitch and the back focal lengths of the lens elements within an array camera. For context, U.S. Pat. No. 8,231,814, entitled "Fabrication Process for Mastering Imaging Lens Arrays" discloses WLO techniques and is hereby incorporated by reference in its entirety, especially as it pertains to replicating lenses across a substrate to form a master waferscale lens array. To mitigate the above-mentioned issues, in many embodiments, optical systems that include at least one injected molded element that is subsequently bonded to a substrate characterized by a low coefficient of thermal expansion are utilized in the construction of array camera modules. These robust optical systems are discussed in greater detail below.

Robust Optical Systems

In many embodiments, optical systems are implemented that can withstand temperature variation and thereby provide improved camera performance under more rigorous environmental conditions by forming lens elements and then subsequently bonding the formed lens elements to a low CTE substrate material. In several embodiments, the optical systems utilize precision glass molded lens elements in conjunction with low CTE substrate material. As mentioned above, when lens elements are formed using WLO techniques, the resulting elements (typically constituted of UV-cured resin or polymers) tend to have refractive indices that are a strong function of temperature. Where polymeric lenses are injection molded, the lens elements and also the substrate tend also to have high coefficients of thermal expansion. By contrast, precision-molded glass lens elements can have more robust optical characteristics. In several embodiments, UV cured resins are only used to bond lens elements to the low CTE substrate material. As such, the comparatively high CTE of the UV cured resins results in lower thermal variation in the optical system when compared to an equivalent optical system incorporating lens elements formed by curing UV resins directly onto the substrate. Thus, for example, in many embodiments, at least one glass lens element is bonded to a low CTE substrate material using UV cured resin.

In many embodiments, the optical systems incorporate a substrate characterized by a relatively low coefficient of thermal expansion to support constituent lens elements. For example, in many embodiments, a glass substrate is implemented; as can be appreciated glass can be made to have a relatively low coefficient of thermal expansion compared to polymers. Such a configuration can be particularly suitable for array cameras as they can result in reduced pitch variation—e.g. the distance between adjacent lenses can remain relatively stable independent of temperature variation. This principle is illustrated in FIGS. 4A-4C. In particular, FIG. 4A depicts a baseline optical system 400 including a substrate 402 and lens elements 404; notably, the optical system 400 is at a baseline temperature T1, and the distance between adjacent elements 404 is labeled as d1. FIG. 4B depicts the case when the ambient temperature is raised to a temperature T2, and where the substrate 402 is made from a material characterized by a relatively high coefficient of thermal expansion. Note that the relatively high coefficient of thermal expansion has caused the substrate 402 to expand such that the distance between the adjacent lens elements 404 has lengthened to distance d2. As can be appreciated, this displacement can result in a host of performance related issues. For example, the displacement can result in a misalignment between a respective lens stack and its associated focal plane (e.g. resulting in de-calibration), and as a result, the respective camera(s) may not be able to properly capture image data.

FIG. 4C depicts the case where the ambient temperature has been raised to a temperature T2, but where the substrate 402 is made of a material characterized by a relatively low coefficient of thermal expansion. In this instance, because of the substrate's relatively low coefficient of thermal expansion, the distance between adjacent lens elements d1 has not changed to a significant extent, and thus the above-mentioned consequences related to the displacement of the lenses can be avoided.

As alluded to above, in many instances, the substrate is made of glass, as glass can be made to have a relatively low coefficient of thermal expansion. A substrate made of glass is additionally beneficial in that glass is optically transparent—hence, lens elements can be directly adhered to the glass. By contrast, where a non-optically transparent material is used, holes would have to be bored through the material to accommodate any desired lens stacks/optical channels. Of course, it should be clear that any suitable material having a relatively low coefficient of thermal expansion can be utilized to construct an optical system as appropriate to the requirements of specific applications in accordance with embodiments of the invention.

While the incorporation of substrates characterized by relatively low coefficients of thermal expansion are discussed, in many instances substrates that have a non-negligible coefficient of thermal expansion are implemented in some embodiments—however, these implemented substrates have coefficients of thermal expansion that match that of an associated imager array. In this way, even where the pitch of the lenses within the substrate varies with temperature, the positioning of the respective associated focal planes also vary similarly with temperature such that the lens stacks remain relatively aligned with their respective focal planes even with variation in temperature. For example, the following coefficients of thermal expansion have been reported: Silicon ~$2.6 \times 10^{-6}$/K; AF32 glass substrate ~$3.2 \times 10^{-6}$/K; B33 glass substrate ~$3.25 \times 10^{-6}$/K; AF45 glass substrate ~$4.5 \times 10^{-6}$/K; and D263T glass substrate ~$7.2 \times 10^{-6}$/K. Any of the above-listed glass substrates can be incorporated in accordance with several embodiments of the invention.

In numerous embodiments, robust optical systems include at least one lens element made of glass disposed on a substrate. As mentioned above, glass can be made such that its optical characteristics remain largely, if not entirely, consistent even with variation in temperature. By contrast, for example, lens elements fabricated from polymer tend to have relatively high coefficients of thermal expansion and/or refractive indices that vary with temperature. Thus, where polymer lens elements are incorporated, their refractive/optical power can change with temperature. For context, the coefficient of thermal expansion of polymers such as PMMA, Polycarbonate, and Zeonex is on the order of $70 \times 10^{-6}$/K-$77 \times 10^{-6}$/K. Even, if their geometry is held fixed (e.g. via mechanical constraints), their index of refraction can vary as a function of temperature. As can be appreciated, changes in the index of refraction can significantly impact a respective lens element's back focal length, which can be of principle concern in camera performance. Where lens geometry also changes as a function of temperature (e.g. via thermal expansion), the change in geometry can further influence the back focal length. For example, in some instances, the change in lens geometry further exaggerates the change in index of refraction inherently caused by temperature variation. In several instances, the change in lens geometry counteracts the change in index of refraction inherently caused by temperature variation.

FIGS. 5A-5C illustrate how temperature variation can impact the optical characteristics of a camera system. In particular, FIG. 5A depicts a baseline camera system 500 at a temperature T1. More specifically, a camera system including a substrate 502, itself including constituent lens elements 504, and an image sensor 506 are depicted. The back focal lengths of the lens elements is also indicated via ray-tracing 508, and the image sensor is shown to be appropriately aligned with the back focal lengths of the lens elements. FIG. 5B depicts the optical system at an elevated temperature T2, where the lens elements 504 are characterized by a coefficient of thermal expansion and/or refractive indexes that vary to a sufficient extent during temperature variations experienced during typical operating conditions so as to modify the back focal length of the optical system and perceptibly increase the blur of images captured by the focal planes of the image sensor 506. Note that the elevated temperature T2 has distorted the back focal lengths of the lens elements 504. More specifically, it is depicted that the back focal length has increased, and as a result, the image sensor 506 is no longer aligned with the focal plane. As can be appreciated, this misalignment can result in substandard camera performance. Note that although an enlarging of the back focal length is depicted, it should be clear that the optical characteristics of lens elements can vary in any of a variety of ways with temperature based on the particular geometry, the constituent material, and the overall configuration. In general, increased temperature tends to reduce the refractive index of a material (as the density of the lens material is reduced), which tends to increase focal length. Further, an increase in temperature also tends to expand a material (if it is unconstrained), which also can increase its focal length (e.g. thermal expansion can result in a larger radius of curvature). Although, note that where wafer level optics is implemented, lens elements are typically bonded to a fixed substrate; consequently thermal expansion tends to expand the lens elements only in a vertical direction which tends to reduce the radius of curvature, and correspondingly acts to reduce the focal length.

By contrast, FIG. 5C depicts the camera system 500 at an elevated temperature T2 whereby the lenses 504 are constructed from glass materials characterized by stable optical characteristics even with varying temperature. In particular, it is depicted that the back focal lengths have not varied even with the temperature elevation. Thus, because of the stability of the back focal length, the image sensor 506 can be appropriately aligned even with a variation in temperature.

As can be appreciated, the ability to have a consistent back focal length is particularly significant in the performance of an array camera, largely because parallax detection and super-resolution processes tend to be particularly sensitive to any sort of defocus.

Figure 6:
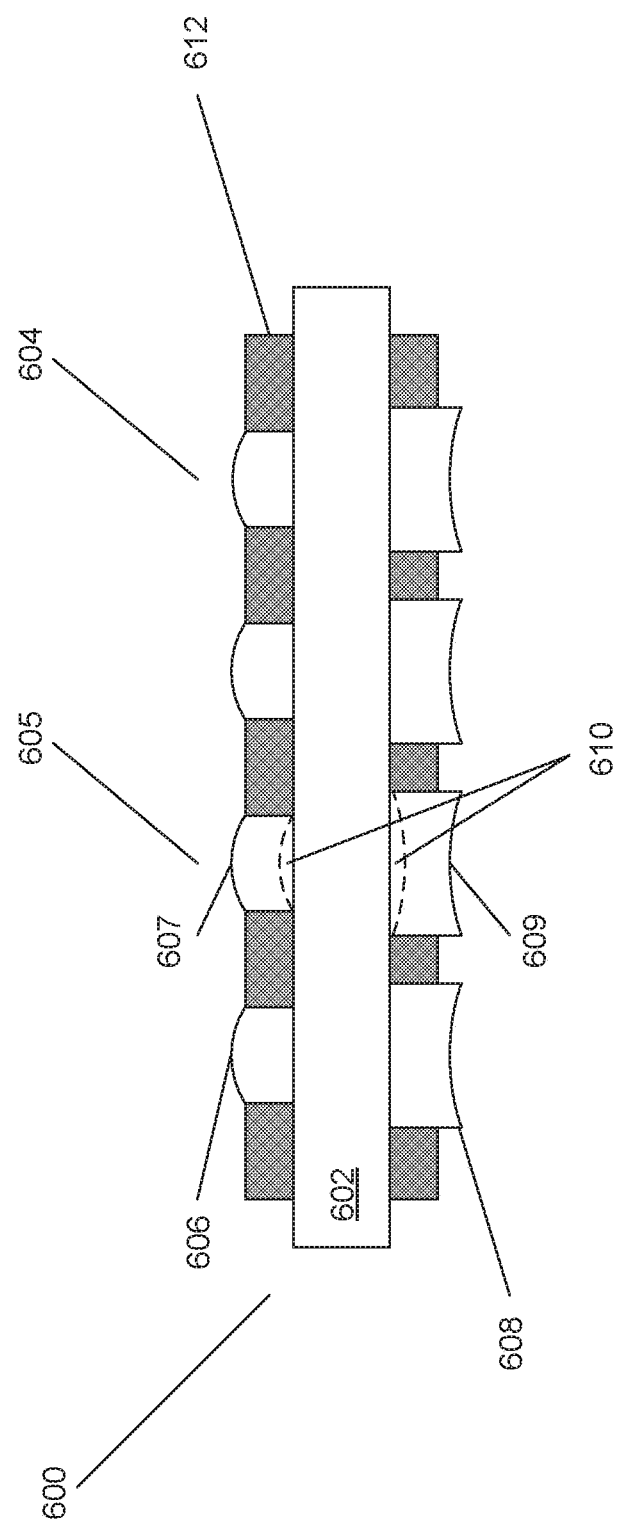
FIG. 6 illustrates a robust optical system that includes a glass substrate, glass lens elements, secondary lens elements, and a thick mask in accordance with an embodiment of the invention.

While the above discussion and accompanying figures have depicted the manner in which thermal expansion and/or temperature-based optical characteristic variation of the constituent materials of the optical system can degrade camera performance with reference to optical systems having lens stacks that only have a single lens element, it should of course be appreciated that robust optical systems in accordance with many embodiments of the invention can define a plurality of lens stacks, each including a plurality of optical elements. For instance, FIG. 6 depicts a robust optical system having lens stacks that each have two lens elements. In particular, FIG. 6 depicts an optical system 600 including a glass substrate 602 and four lens stacks 604 that each include a primary optical element 606, and a secondary lens element 608. More specifically, the primary lens element 606 is plano-convex, and the secondary element 608 is plano-concave for three of the lens stacks. The 'plano' surface can allow the lens elements to more easily adhere to the substrate surface. In a number of embodiments, the lens elements are formed using precision glass molding to form glass elements and/or injection molding to form plastic elements. By not requiring UV curing, the class of materials that can be utilized in the formation of the lens elements can be significantly increased enabling the formation of lens elements from glass and/or more thermally stable polymers. In many instances, the plano surface and/or the substrate are subjected to additional grinding/polishing steps to better flatten them, and thereby allow them to better adhere to one another. While much of the discussion herein relates to the use of precision glass- or injection molded lens elements, any process that enables the formation of lens elements that can be bonded to a low CTE substrate can be utilized to form lens elements as appropriate to the requirements of specific applications in accordance with embodiments of the invention.

Lens stack 605 includes a primary lens element that is a meniscus lens 607, and includes a secondary lens element that is a biconcave lens 609. While certain lens geometries are depicted, it should of course be clear that any of a variety of lens geometries can be incorporated in accordance with many embodiments of the invention; the particular lens geometries implemented can be based on a desired optical design. Lens geometries having a circular footprint are beneficial insofar as they can benefit alignment of lenses within a lens stack. For instance, only the optical center of circular lens elements within a lens stack needs to be aligned; and this can be accomplished by using alignment marks and machine vision and/or using a pilot beam. In some instances, rectangular lens elements are incorporated where a closer pitch is desired. But it should be clear that any of a variety of lens geometries can be implemented in many embodiments of the invention.

Gaps 610 separate the meniscus lens 607 and the biconcave lens from the glass substrate 602. These gaps 610 can be filled with air, an optical adhesive, vacuum or any suitable material. In effect, the gaps can enable more degrees of freedom in the optical design as the material that is used to fill the gap (or vacuum) can be selected based upon the desired optical characteristics for the gap—e.g. the abbe number or refractive index. In many embodiments, the gaps are strategically filled to implement fully immersed achromats. Of course, as can be appreciated, the adhesive materials that are implemented can be those that are characterized by stability with temperature, e.g. those that are also characterized by a low dependency of refractive index on temperature and/or low coefficient of thermal expansion. In many embodiments, an adhesive material with a refractive index between the refractive indices of the lens element and the substrate can be utilized. In several embodiments, the refractive index of the adhesive material is the average of the refractive indices of the lens and substrate material. Due to the small amount of bonding material, however, the adhesive can also be characterized by a relatively highly temperature-dependent refractive index and/or a relatively high coefficient of thermal expansion material, such as (but not limited to) UV cured resin, without significantly impacting the overall thermal performance of the optical system. The gaps between the lens element and the substrate allow the substrate-sided lens surface to take any shape (within the given height constraints), which can be beneficial to improve the performance of the overall lens design. Mechanical stand-offs can be included in the lens molding process to define a mechanical reference between the lens element and the substrate during the manufacture of the optical system. Filling the air gap with optical resin of the required optical properties can enable the construction of fully immersed achromates. However, consideration may be given as to the extent to which filling a cavity with resin impacts the overall thermal stability of the optical system. In various embodiments in which an air gap is maintained between the lens element and the substrate, a significant difference in refractive indices can be created resulting in the lens element having increased optical power relative to a design that did not incorporate an air gap. The presence of the air gap may, however, result in increased Fresnel reflections from the interfacing lens or substrate surfaces. Accordingly, anti-reflective coatings can be applied to one or more surfaces of the lens element and/or the surface of the substrate to reduce the impact of Fresnel reflections.

As can be appreciated, the robust optical system 600 is intended to be oriented such that the primary lens elements 606 are proximate the scene to be imaged, while the secondary lens elements 608 are intended to be proximate the image sensor. In the illustrated embodiment, each of the primary lens elements are made of glass. As one of ordinary skill in the art can appreciate, the optics of a respective lens stack are principally governed by the primary lens element. Accordingly, as the primary lens elements are of more relative importance with respect to the thermal stability of the optics, it can be beneficial fabricate them from a more thermally stable material. Further, manufacturing the lens elements out of glass is further advantageous inasmuch as glass is relatively more transparent with respect to infrared. By contrast, polymer lens elements tend to absorb infrared electromagnetic waves. In effect, glass lens elements are less likely to distort the imaging of infrared electromagnetic waves.

In many instances, because the optics of the primary lens elements play such a big role in governing the optics of the respective lens stacks, great care is exercised in making the lens elements precisely. Thus, in many instances, cavity-matching or binning is implemented to facilitate uniformity of lens elements across the lens stack array. Binning generally refers to the grouping of lens elements that are deemed to be sufficiently similar after fabrication, so that they can be similarly situated within a respective optic array. For example, lens elements fabricated from the same cavity ('cavity-matched') may be sufficiently similar. While the lens elements may vary based upon the color channel imaged by a particular optical channel, lens stacks that image the same color channel are typically designed to have the same lens stacks. Therefore, cavity-matching involves using lens elements from the same mold for each of the lens elements that image the color channel for which the lens element was designed. Further, in many instances, binning strategies are implemented whereby lens elements fabricated from certain cavities are associated with certain substrate thicknesses within overall batch variation and/or adhesives with differently sized spacer-beads to increase homogeneity of the fabricated optical systems so as to optimize yield. In many embodiments, at least one lens element differs between lens stacks that image different color channels (i.e. include different spectral filters). In several embodiments, all of the optical elements differ between lens stacks that image different color channels. While binning/cavity-matching strategies are discussed with respect to primary lens elements, in many embodiments these strategies are also implemented with respect to forming secondary lens elements within an optic array.

As the secondary lens elements do not play as a big a role in governing the optics, it is not as critical for them to be fabricated out of an optically resilient and/or thermally stable material. Instead, the secondary lens elements may be fabricated from a more cost-effective material, for example. In many instances, the secondary lens elements are fabricated from plastic, which itself can be made to be relatively optically robust. Of course, it should be clear that the secondary lens elements can be fabricated using any suitable material, including UV cured resin or any suitable polymer, in accordance with many embodiments of the invention. And of course, any suitable technique may be implemented to fabricate the lenses, including any of the techniques described above, including those mentioned in U.S. Pat. No. 8,231,814, incorporated by reference above.

Notably, it is further depicted that the illustrated optical system 600 includes a mask 612. In particular, the illustrated embodiment depicts a thick mask 612 having a thickness that is approximately on the order of magnitude of the thickness of the lens element. Thick masks can be implemented so as to create a 'virtual barrel' and thereby provide some degree of optical isolation between lens stacks within any given optical array. In this way, the cross-talk issues discussed above can be mitigated.

Thick masks can be incorporated by first bonding the lens elements that are to be adjacent to the substrate, and then filling the space in between the lens elements with the mask material. Of course, it should be clear that any suitable way of developing the mask can be incorporated in accordance with many embodiments of the invention. While thick masks having a thickness on the order of the thickness of a lens element are discussed, it should be clear that the mask thickness can be any suitable thickness in accordance with many embodiments of the invention.

Figure 7:
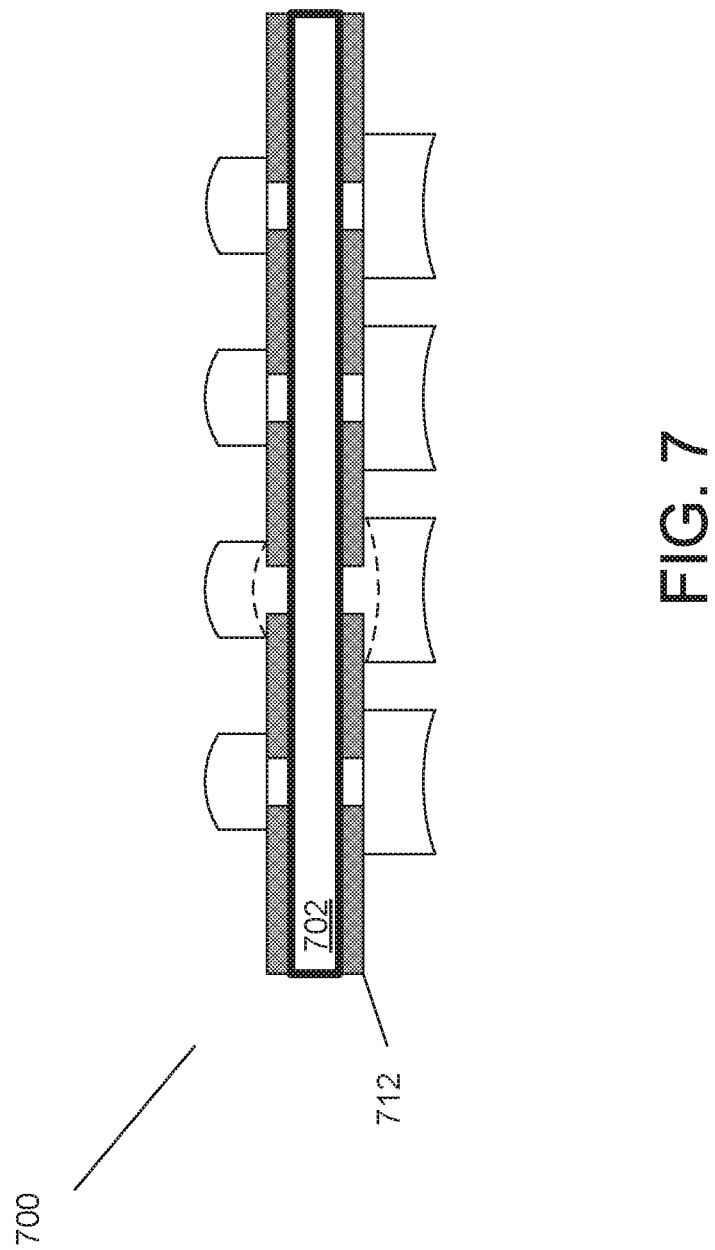
FIG. 7 illustrates a robust optical system that includes a glass substrate, and thin aperture-defining masks, upon which lens elements are disposed in accordance with an embodiment of the invention.

In some instances, thin masks are implemented. Thin masks can be implemented where it is desired that the aperture be smaller than the lens diameter and/or where the aperture needs to be more precisely manufactured. The thin masks can be lithographically applied prior to the bonding of the lens elements using an opaque thin resin or a black ("oxidized") metal layer. These lithographic techniques are advantageous insofar as they can be very precisely developed, moreover lithographic methods are fairly well developed, and thus it can be easy for the techniques to be implemented. FIG. 7 depicts a robust optical system that includes thin masks. In particular, the robust optical system 700 is similar to that seen in FIG. 6, except that thin masks 712 define the aperture stops.

Figure 8:
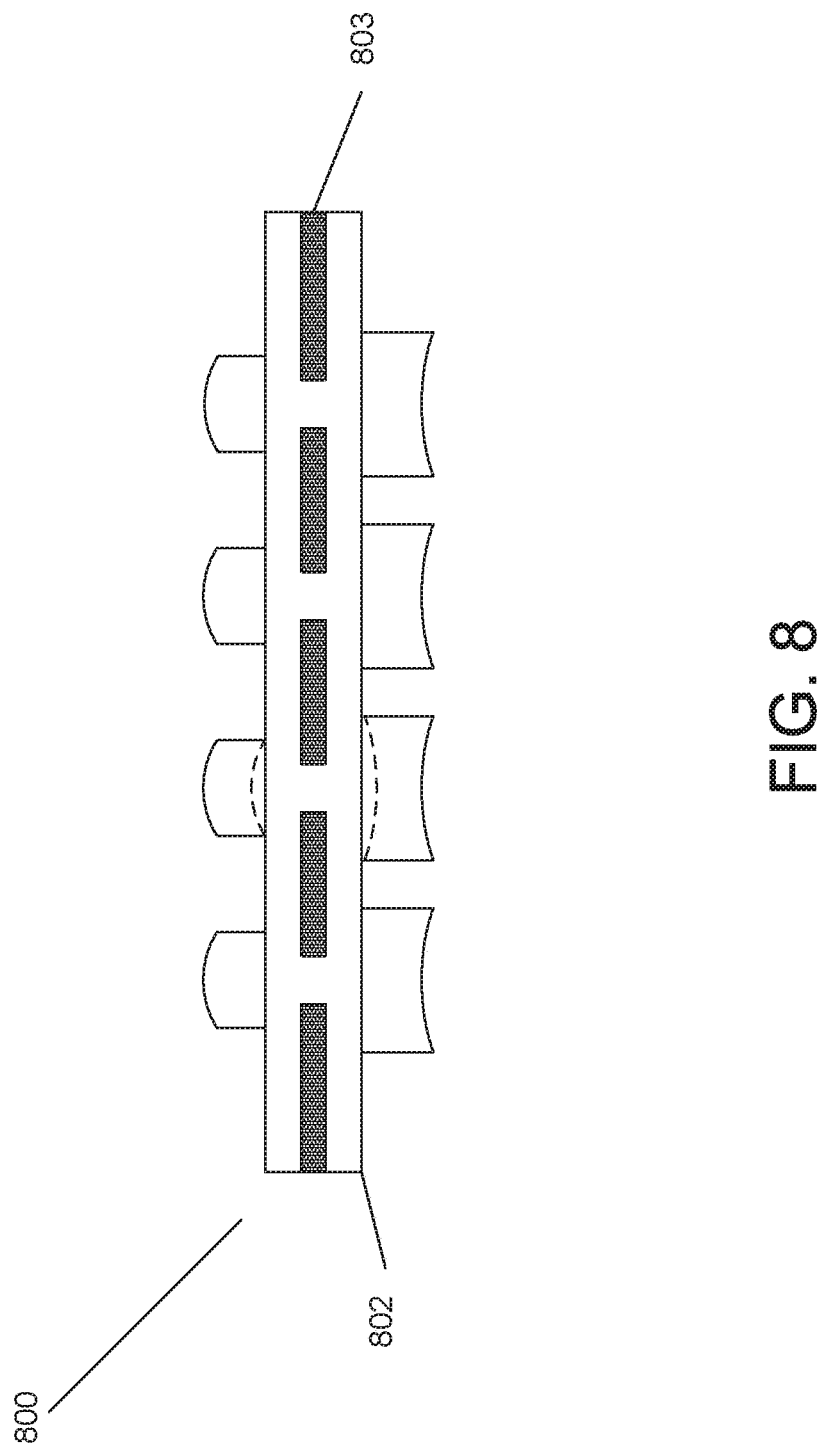
FIG. 8 illustrates a robust optical system that includes an aperture-defining layer embedded within the glass substrate in accordance with an embodiment of the invention.

While the above description has described a robust optical system that implements a homogenous glass substrate. In many embodiments, the glass substrate is modified to provide for enhanced performance. For instance, in some embodiments, aperture stops are integrated within the glass substrate. For example, FIG. 8 depicts a robust optical substrate having integrated aperture stops in accordance with an embodiment of the invention. In particular, the robust optical system 800 is similar to that seen in FIG. 6, except that the glass substrate includes integrated aperture stops 803. Such a structure can be fabricated for example by fabricating a first half of the glass substrate, applying a mask to the first half that defines the aperture stops, and thereafter laminating the second half of the glass substrate to the masked first half.

Figure 9:
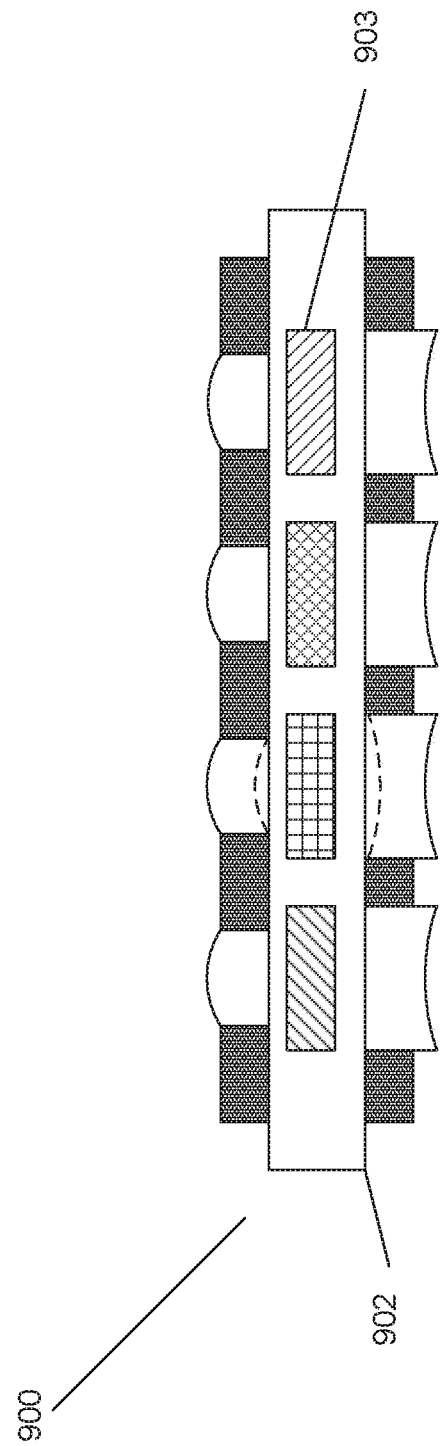
FIG. 9 illustrates a robust optical system that includes color filters embedded within a glass substrate in accordance with an embodiment of the invention.

In a number of embodiments, a glass substrate is fabricated so as to include embedded color filters. As discussed in U.S. patent application Ser. No. 14/561,925, entitled "Array Cameras and Array Camera Modules Including Spectral Filters Disposed Outside of a Constituent Image Sensor," many array camera configurations implement color filters at the sensor level. However, this can be disadvantageous insofar as including microlenses at the sensor level can have the effect of increasing pixel stack height. Increasing pixel stack height can in turn have the effect of exacerbating cross-talk issues. Accordingly, U.S. patent application Ser. No. 14/561,925 discloses strategies for removing color filtration at the sensor level. The disclosure of U.S. patent application Ser. No. 14/561,925 is incorporated by reference in its entirety, especially as it pertains to positioning color filters proximate or within glass substrates. Similarly, in many embodiments of the invention, color filtration is implemented within a glass substrate. For example, FIG. 9 depicts a robust optical system including color filters embedded within a glass substrate. In particular, the robust optical system 900 includes a color filter 903 for each constituent lens stack in the substrate 902. As before, such a structure can be fabricated for example by fabricating a first half of the glass substrate, applying a mask to the first half that defines the filters, and thereafter laminating the second half of the glass substrate to the masked first half.

While the above descriptions and associated figures have depicted robust optical systems comprising a single substrate, it should be clear that robust optical systems can include multiple substrates in many embodiments. For example, multiple substrates could be independently manufactured, and thereafter aligned to construct a robust optical system. More generally, although the present invention has been described in certain specific aspects, many additional modifications and variations would be apparent to those skilled in the art. It is therefore to be understood that the present invention may be practiced otherwise than specifically described. Thus, embodiments of the present invention should be considered in all respects as illustrative and not restrictive.

Furthermore, while the above description contains many specific embodiments of the invention, these should not be construed as limitations on the scope of the invention, but rather as an example of one embodiment thereof. Accordingly, the scope of the invention should be determined not by the embodiments illustrated, but by the appended claims and their equivalents.

What is claimed is:

1. A camera array, comprising:
a processor;
memory; and
an optical system comprising:
- a carrier substrate supporting a plurality of lens elements bonded to the carrier substrate including at least one glass lens element;
- a primary lens element proximate to a scene to be imaged and having a first coefficient of thermal expansion;
- a secondary lens element proximate to an image sensor and having a second coefficient of thermal expansion that is different from the first coefficient of thermal expansion;
- wherein the image sensor is aligned with the back focal lengths of the plurality of lens elements;
- wherein at least one lens element differs between lens stacks that image different color channels.

2. The camera array of claim 1, wherein the first coefficient of thermal expansion is lower than the second coefficient of the thermal expansion.

3. The camera array of claim 1, wherein the carrier substrate is a glass material having a relatively low coefficient of thermal expansion such that optical characteristics of the glass remain consistent with variations in temperature.

4. The camera array of claim 1, wherein the at least one glass lens element has a lower coefficient of thermal expansion relative to a coefficient of thermal expansion of a polymer material used for the secondary lens element.

5. The camera array of claim 1, further comprising an aperture-defining mask disposed on the carrier substrate.

6. The camera array of claim 5, wherein the aperture defining mask creates virtual lens barrels providing optical isolation between lens stacks.

7. The camera array of claim 5, wherein the mask has a thickness that is approximately on the order of magnitude of the thickness of the lens element.

8. The camera array of claim 1, wherein at least one lens element is distanced from the carrier substrate by an air gap.

9. The camera array of claim 1, wherein at least one lens element is distanced from the carrier substrate by a material having different optical characteristics.

10. The camera array of claim 1, wherein the primary lens element is plano-convex and the secondary lens element is plano-concave.

11. The camera array of claim 1, wherein the primary lens element was formed using precision glass molding and the secondary lens element was formed using injection molding to form plastic elements.

12. The camera array of claim 1, wherein the primary lens element is a meniscus lens and the secondary lens element is a biconcave lens.

13. The camera array of claim 12, wherein a gap separates the meniscus lens and the biconcave lens from the glass substrate.

14. The camera array of claim 1, wherein the carrier substrate is a glass substrate with integrated aperture stops.

15. The camera array of claim 1, wherein all of the optical elements differ between lens stacks that image different color channels.

16. The camera array of claim 1, wherein the glass substrate is fabricated so as to include embedded color filters.

17. The camera array of claim 1, wherein the optical system further comprises a color filter for each constituent lens stack in the carrier substrate.

18. The camera array of claim 1, wherein the plurality of lens elements comprise lens elements fabricated from certain cavities associated with certain substrate thicknesses within overall batch variation and adhesives with differently sized spacer-beads to increase homogeneity of the fabricated optical system.

19. A camera array comprising:
a processor;
memory; and
an optical system comprising:
- a glass carrier substrate supporting a plurality of lens elements bonded to the carrier substrate;
- a glass lens element proximate to a scene to be imaged and having a first coefficient of thermal expansion;
- a polymer lens element proximate to an image sensor and having a second coefficient of thermal expansion that is higher than the first coefficient of thermal expansion;
- wherein the image sensor is aligned with the back focal lengths of the plurality of lens elements;
- wherein at least one lens element differs between lens stacks that image different color channels.

* * * * *